G. W. MELVILLE & J. H. MACALPINE.
REDUCTION GEARING.
APPLICATION FILED FEB. 23, 1907.

946,455.

Patented Jan. 11, 1910.
9 SHEETS—SHEET 1.

Fig. 1.

WITNESSES:

INVENTORS
Geo. W. Melville
John H. Macalpine
BY
ATTORNEY

G. W. MELVILLE & J. H. MACALPINE.
REDUCTION GEARING.
APPLICATION FILED FEB. 23, 1907.

946,455.

Patented Jan. 11, 1910.
9 SHEETS—SHEET 3.

Fig. 3.

G. W. MELVILLE & J. H. MACALPINE.
REDUCTION GEARING.
APPLICATION FILED FEB. 23, 1907.

946,455.

Patented Jan. 11, 1910.
9 SHEETS—SHEET 6.

UNITED STATES PATENT OFFICE.

GEORGE W. MELVILLE AND JOHN H. MACALPINE, OF PHILADELPHIA, PENNSYLVANIA.

REDUCTION-GEARING.

946,455.      Specification of Letters Patent.      Patented Jan. 11, 1910.

Application filed February 23, 1907. Serial No. 359,014.

*To all whom it may concern:*

Be it known that we, GEORGE W. MELVILLE and JOHN H. MACALPINE, citizens of the United States, and residents of Philadelphia, in the county of Philadelphia and State of Pennsylvania, have made a new and useful Invention in Reduction-Gearing, of which the following is a specification.

This invention relates to reduction gearing and has for an object the production of gearing for transmitting power from turbines or other high speed motors to apparatus to be run at lower speeds.

A further object of this invention is the production of a reduction gearing in which the tooth pressures during the operation of the gear are automatically adjusted and distributed.

The apparatus which we have chosen to illustrate our invention is adapted to transmit the power delivered by a turbine or other high speed motor to another shaft or apparatus such as a ship's propeller shaft which it is desired to drive at a slower speed.

Broadly the device is a spur gearing consisting of a gear and a pinion in which the pinion is journaled in a floating frame, which permits of relative angular motion between the gear and pinion during operation due to the tooth pressures encountered, whereby said pressures are automatically distributed. The floating frame is mounted on the bed plate of the gearing device in such a way that it is free to assume different positions, both in the horizontal and vertical planes, for the purpose of adjusting the position of the pinion shaft relative to the gear shaft. In the apparatus chosen for illustration the gear has two sets of oppositely disposed spiral teeth and the pinion likewise has two corresponding sets. The mounting member or shaft on which the pinions are carried is hollow and is connected at one end only to a flexible shaft, which extends through the interior thereof and is connected at its other end to the turbine or motor shaft by means of a flexible coupling. The gears which mesh with the pinions are mounted on a common power delivery shaft or member journaled in standards secured to the bed plate of the device. The axes of the pinion carrying member and the gear carrying member are normally in the same horizontal plane and the floating frame of the pinions is mounted on the bed plate in such a way that it may be moved as an integral whole toward the gears, thereby varying the distance between the axes of the carrying member without destroying their parallelism. In the device illustrated, the desired amount of freedom necessary to accomplish the automatic distribution of tooth pressures is given to the frame by mounting it on two alined I-beams, which are located centrally between the ends of the frame and which extend transversely of the axis of the rotatable carrying member or shaft. Such an arrangement gives the floating frame, and consequently the carrying member of the pinions, a certain degree of angular motion in a vertical plane by reason of the flexure of the webs of the I-beams and also a certain degree of angular motion in a horizontal plane by distortion of the webs of the I-beams. The last degree of freedom is limited by struts the reason for the introduction of which will hereinafter be set forth. The carrying member of the pinions is so arranged that it is capable of a certain amount of longitudinal motion through the journals.

Bearing in mind the construction and considering for a time that the floating frame and the pinions are in place, but assuming that the flexible shaft, located within the hollow carrying member of the pinions, is not connected to the motor shaft and that the struts, above referred to, and the large gears, which mesh with the pinions, are not in place; the shaft or carrying member of the pinions will then have the following degrees of freedom, neglecting the constraints due to friction and the elastic resistance of the I-beams supporting the frame: 1st—of rotation about its axis. 2nd—of longitudinal movement in the direction of the axis. 3rd—of angular movement of the axis in a vertical plane by flexure of the webs of the I-beams. 4th—of angular movement in a horizontal plane, (by distortion of the webs of the I-beams). The only constraints that the pinion carrying member is subjected to are motion parallel to itself in a vertical plane and similar motion in a horizontal plane. The second and third degrees of freedom of the floating frame are provided in order that the pinions may automatically adjust themselves with reference to the gears, with which they mesh, so as to automatically distribute the pressure on the teeth of each pinion.

In the drawings accompanying this application and forming a part thereof.

The reduction gearing comprises a pair of pinions 20 mounted on a hollow carrying member 21 journaled in bearings 22 carried in the floating frame 23. The floating frame is mounted on two alined I-beams 24 located midway between the ends of the member 21 and which extend transversely of its axis. The I-beams 24 are secured to the bed plate 25 of the reduction gearing by means of bolts 26, which extend through suitable holes formed in the bed plate and the flange of the I-beams.

A pair of gears 28 is carried by a rotatable element 29, which is journaled in bearings 30 located in standards formed integrally with the bed plate 25. The gears 28 mesh with the pinions 20 and the carrying member of the gears is adapted to deliver power through any suitable coupling to the apparatus to be driven.

Figure 15:
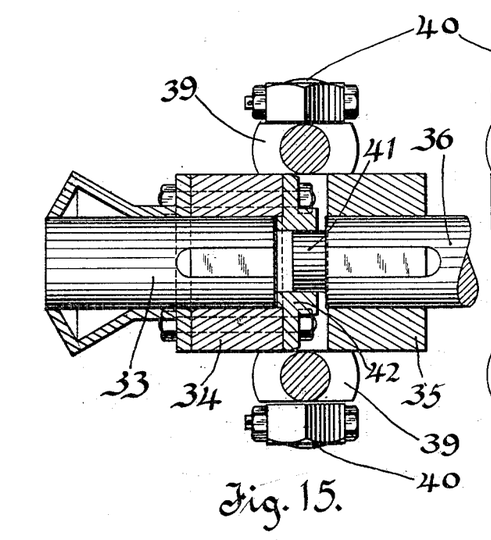
Fig. 15 is a partial section and partial elevation of a flexible coupling which forms a detail of our invention.
Figure 16:
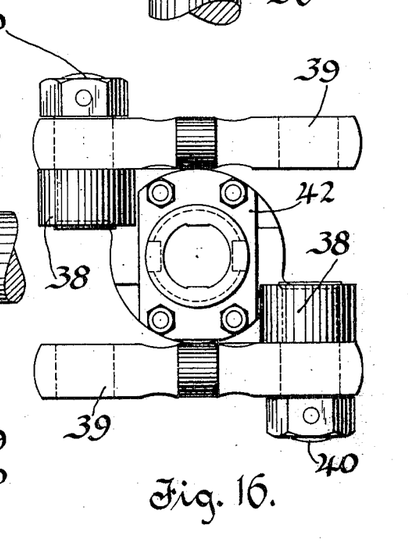
Fig. 16 is an end view of the coupling.
Figure 17:
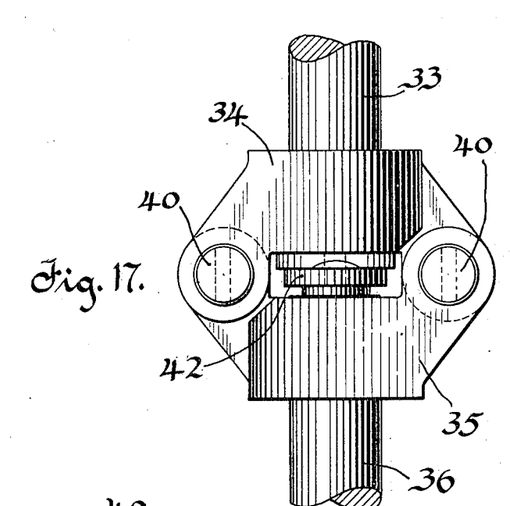
Fig. 17 is a plan view.

The carrying member 21 of the pinions is connected by means of a key-way and bolt connection 32 to a shaft 33, which extends through the interior of the hollow member 21 and which is provided at one end with one element 34 of a flexible coupling, shown specifically in Figs. 15, 16 and 17. The shaft 33 is comparatively flexible and is so long that it would be unstable at a comparatively low speed of revolution; consequently, a suitable number of steadying lugs 31 are formed on the shaft near the middle of its length. These lugs prevent undue deflection of the shaft and also permit of an adequate passage between the shaft and the member 21 for a flow of cooling liquid.

The flexible coupling shown in Figs. 15, 16 and 17 comprises an element 34 mounted on the shaft 33 and an element 35 mounted on a shaft 36 of the turbine or other high speed motor. Fig. 16 is an end view of the element 34 and shaft 33, the shaft 36 and element 35 having been removed. Each element is provided with a lug 38 to which the connecting links 39 are pivotally connected by means of pins 40. Each link 39 connects one of the lugs 38 of the element 34 with one of the lugs 38 of the element 35. The shaft 36 is provided with an extension 41 of reduced diameter which coöperates with a centering piece 42 bolted onto the element 34. The centering piece 42 and the links 39 are so arranged that the shaft 33 is free to move in a longitudinal direction only. When the mechanism is in perfect adjustment, the shaft 36 can only transmit a rotative torque through the coupling to the shaft 33 and thence to the pinion.

The floating frame, and consequently the pinions, may be moved transversely to the axis of the pinion carrying member 21 so as to adjust the position of the pinions relative to the gears 28. This is accomplished by providing slotted holes for the bolts 26 in the flanges of the I-beams 24 and also providing an adjusting wedge 43, which is utilized to vary the position of the I-beams relative to the bed plate and also to hold them rigidly in place. This adjustment is provided so that when the bushes of the bearings have worn and the centers of the gears and pinions have moved slightly apart, they may be restored to their original centers. To do this the bolts 26 are loosened and the wedge 43 is packed forward by means of suitable shims; locking members 44, which are mounted in the bed plate, being provided to keep the wedge 43 and shims in place.

Struts 46 are provided, when it is found necessary, between the floating frame 23 and the bed plate 25. These struts, as has been described, are provided for limiting the angular motion in a horizontal plane, as outlined under the head of "4th degree of freedom". Each strut consists of a straight bar, which is provided with rounded ends. These ends bear in sockets which are let into the floating frame and which are attached to the bed plate respectively. One end of the strut 46 bears against a socket plug 47 which is let into the floating frame portion 23. The other end bears against an adjustable plug socket 48 threaded into a mounting piece 50 rigidly secured to a bracket 51 integrally formed with the bed plate 25. An adjusting lever 52 is bolted or otherwise secured to the plug 48 and is provided at its end with a check device 53 which coöperates with notches 54 formed on the outer periphery of the holding piece 50 to indicate the adjustment of the plug 48 and also to hold the plug in adjustment. The struts are so located, relative to the floating frame, that the heat of the bearings transmitted to the metal of the frame will have no sensible effect on the adjustment of the struts. The inner ends of the struts, or the ends bearing against the plugs 47, will, on expansion of the frame, move vertically downward, but since the struts are normally disposed, relative to the direction of the motion, the versed sine of the arc described by the axis of the strut, will be insensible. The adjusting mechanism which is attached to the bed plate allows a very fine adjustment of the strut.

As each tooth of the pinions 20 has, in a gearing as shown in the drawings, about five contacts to one of each tooth of the large gears, it is found desirable to water cool the pinions and their mounting elements, although it is not as necessary to cool the gears intermeshing therewith. The water cooling system provided for the pinions includes a suitable packing device 55, which delivers water or any other suitable cooling liquid to a passage 56 formed in the end of the shaft 33. The passage 56 communicates with the annular space between the shaft 33 and the member 21 through passages 57. Mounted on the opposite end of the frame 23 is a water catcher 58 which is adapted to receive the water discharged from the interior passage and deliver it to any suitable draining device. The catcher consists of an impeller 59, which is mounted on the shaft 33 and is inclosed within a casing 61 which is mounted on the bed plate 25 of the gearing and which permits the necessary freedom of motion of the frame 23.

The oiling may be either forced or unforced, as desired. The mounting members of both pinions and gears are formed beyond the journals so as to keep the oil of the journals and that of the gears separate. While a little oil from the bearings might escape into the gear space, by the arrangement shown, it is practically impossible for oil from the gears to mix with the bearing oil. Oil is delivered to the journals 22 through passages 63 formed in the frame portion 23 and is discharged through passages 64, located at each end of each bearing. Each passage 64 communicates with an annular passage 65 formed between the member 21 and the adjacent wall of the frame 23 and in which a collar 66, formed integrally with the member 21, operates to discharge the oil into the passage 64. The arrangement of the pinion and the member 21 is such that it is practically impossible for oil from the gear space to enter the passage 64 and mix with the oil discharged from the journals.

In the apparatus illustrated the gears are provided with spiral teeth, but as will hereinafter be explained, straight teeth may be utilized just as effectively with a slight modification in the construction of the carrying members of the gears and pinions. When the pinions and gears are in action the longitudinal position of the pinions and the angular position of their axis are determined exclusively by the action of the spiral teeth of the pinions and gears. The flexible coupling between the motor shaft 36 and the pinions, which, in reality, includes the shaft 33 and the flexible coupling as illustrated in Figs. 15, 16 and 17, can only exert a rotative torque on the pinions. This coupling can exert no force axially when the mechanism is in perfect adjustment, as the links 39 of the coupling are transverse to the axis. When the mechanism is out of adjustment the largest amount allowable, the axial forces exerted by the links are relatively minute compared with the forces exerted by the teeth when the gear is under full load. The shaft 33 exerts no resistance to angular motion of the axis of the pinions other than that due to the elastic resistance, which is small in comparison to the other forces encountered.

Figure 1:
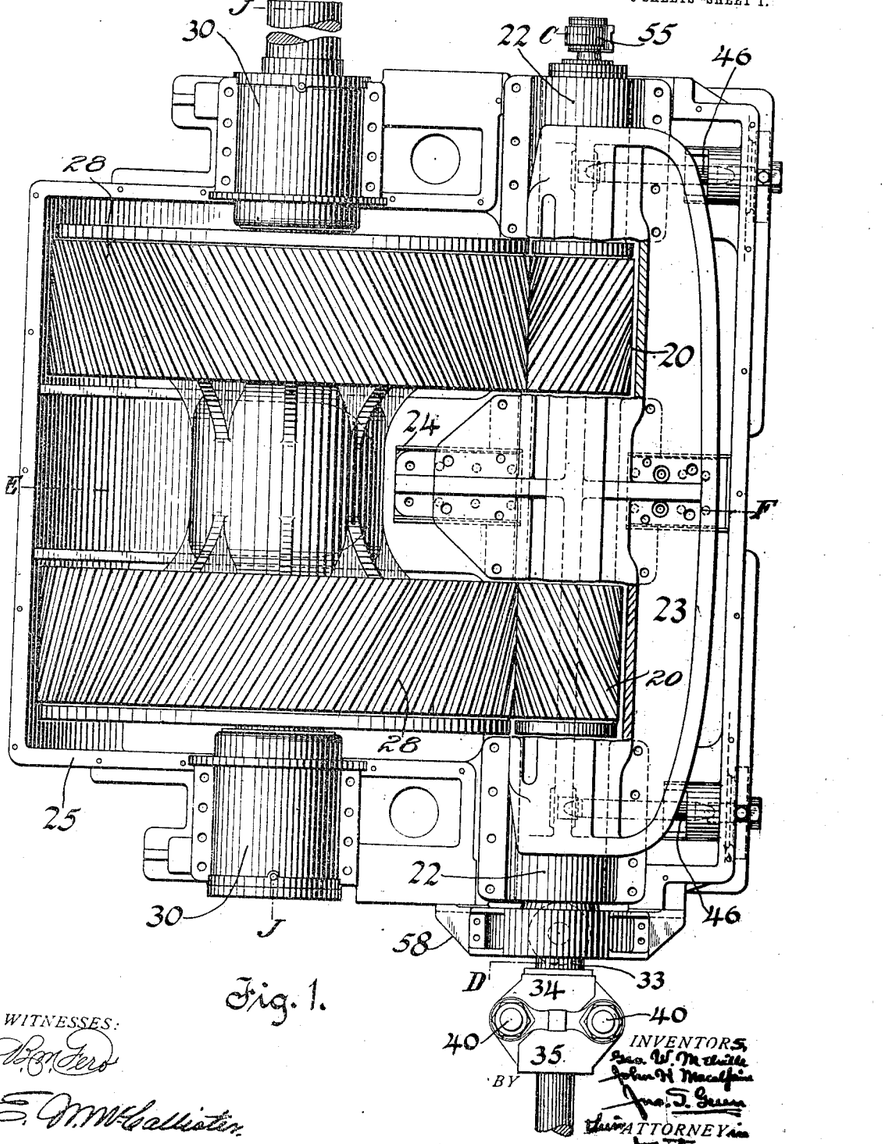
Figure 1 is a plan view of a reduction gearing embodying our invention. A portion of the device is removed and a portion broken away for convenience of illustration.
Figures 2, 18:
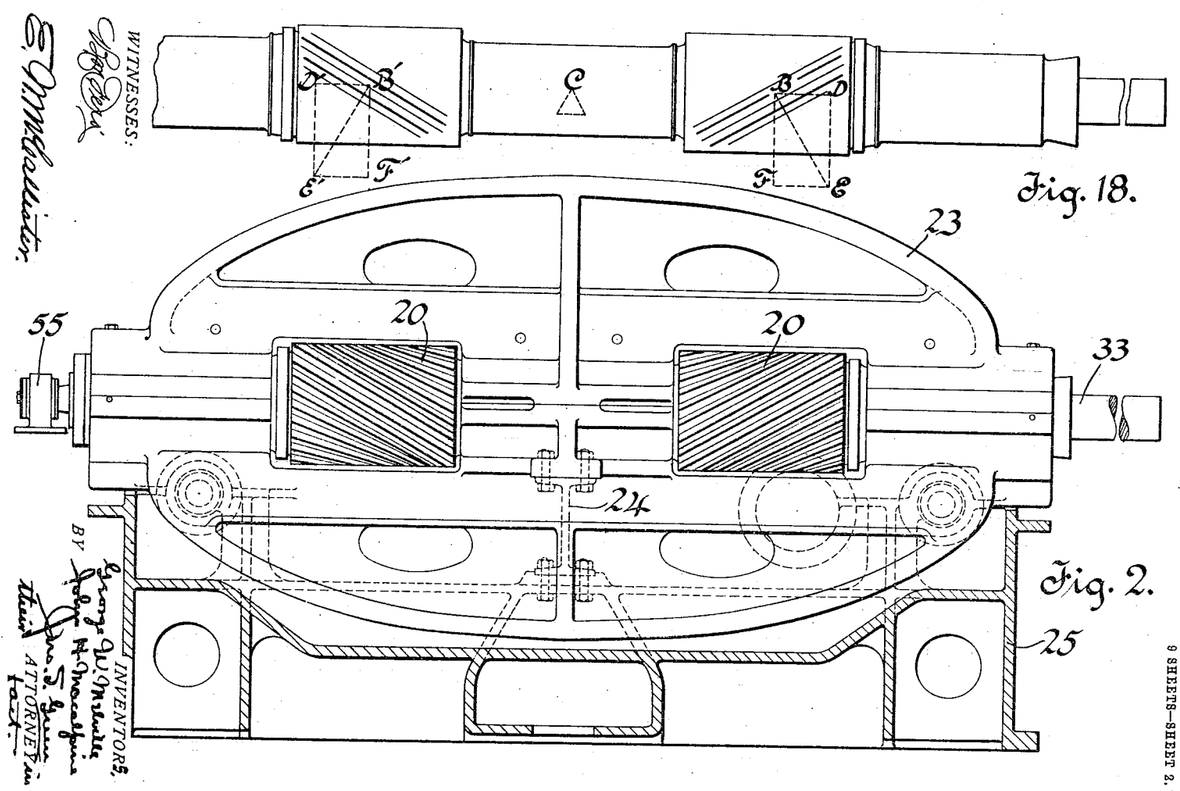
Fig. 2 is a side elevation of the floating frame embodied in our invention in connection with a section of the bed plate of the gearing along the line C—D of Fig. 1, the pinion being shown in elevation.
Fig. 18 is a diagrammatic illustration of the forces encountered by the teeth of the gears.
Figure 3:
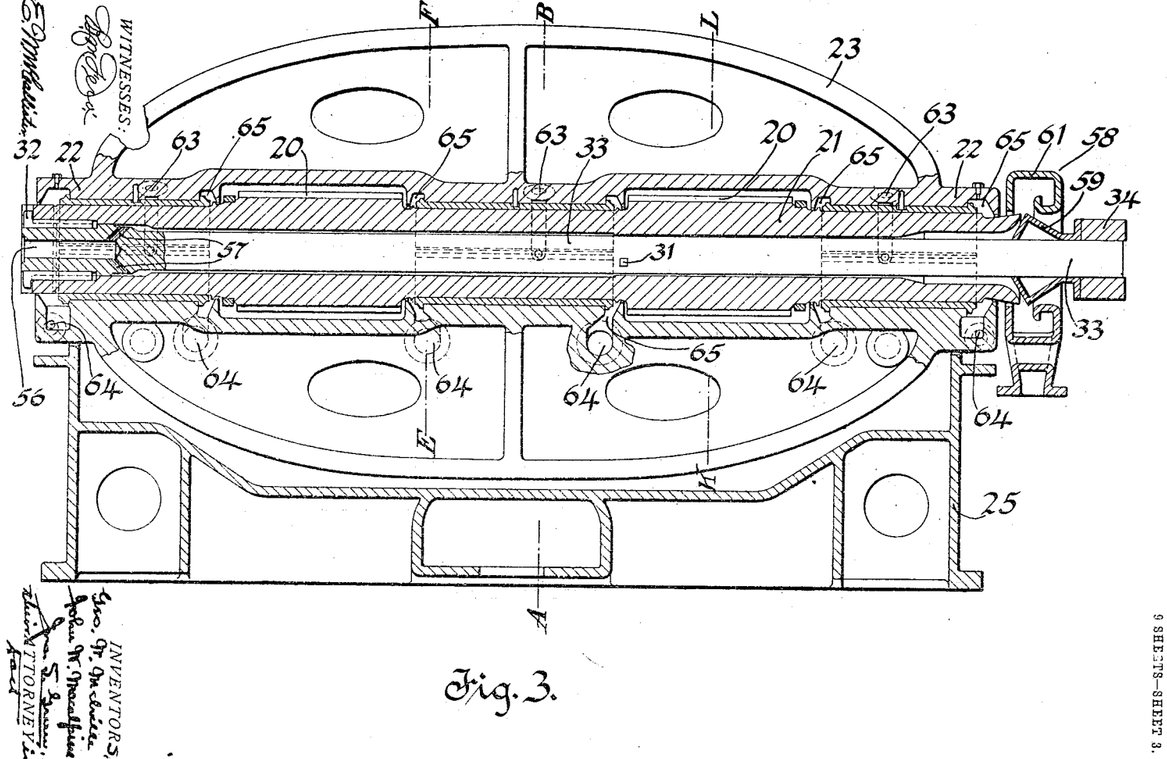
Fig. 3 is a section through the floating frame and the pinion carrying member along the line C—D of Fig. 1.
Figure 4:
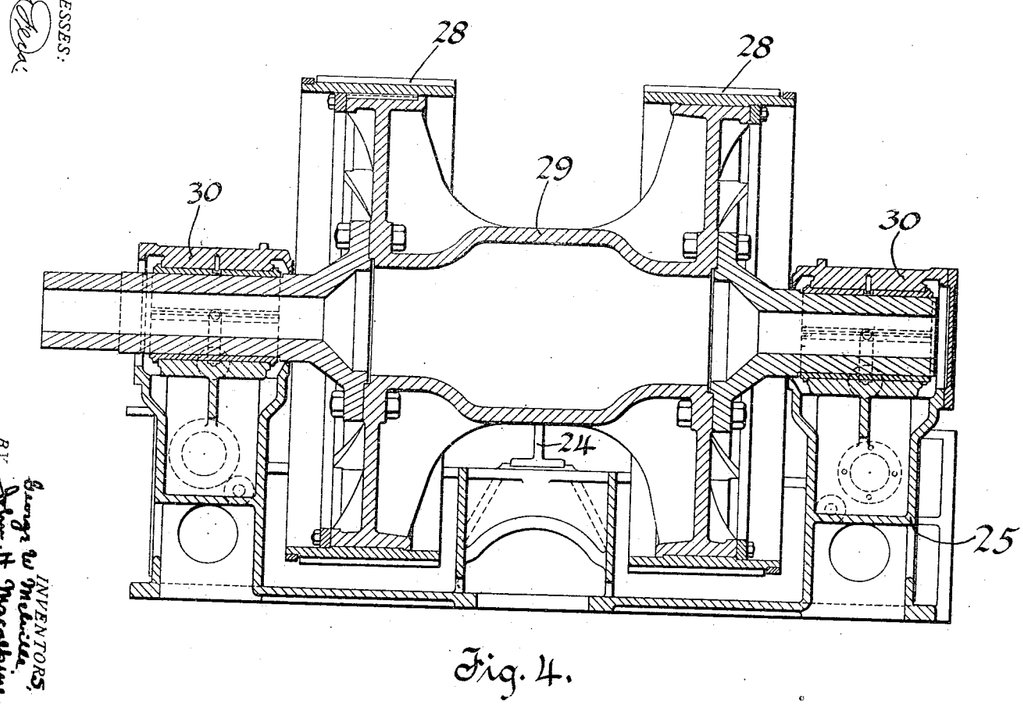
Fig. 4 is a section along the line J—J of Fig. 1.
Figure 5:
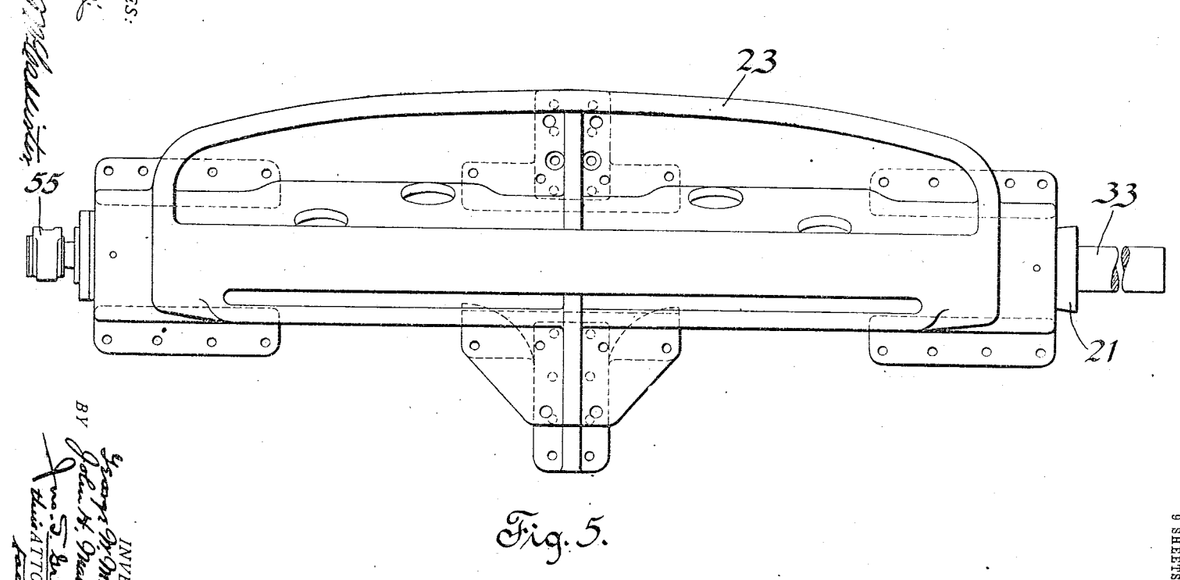
Fig. 5 is a plan view of the floating frame.
Figures 6, 7:
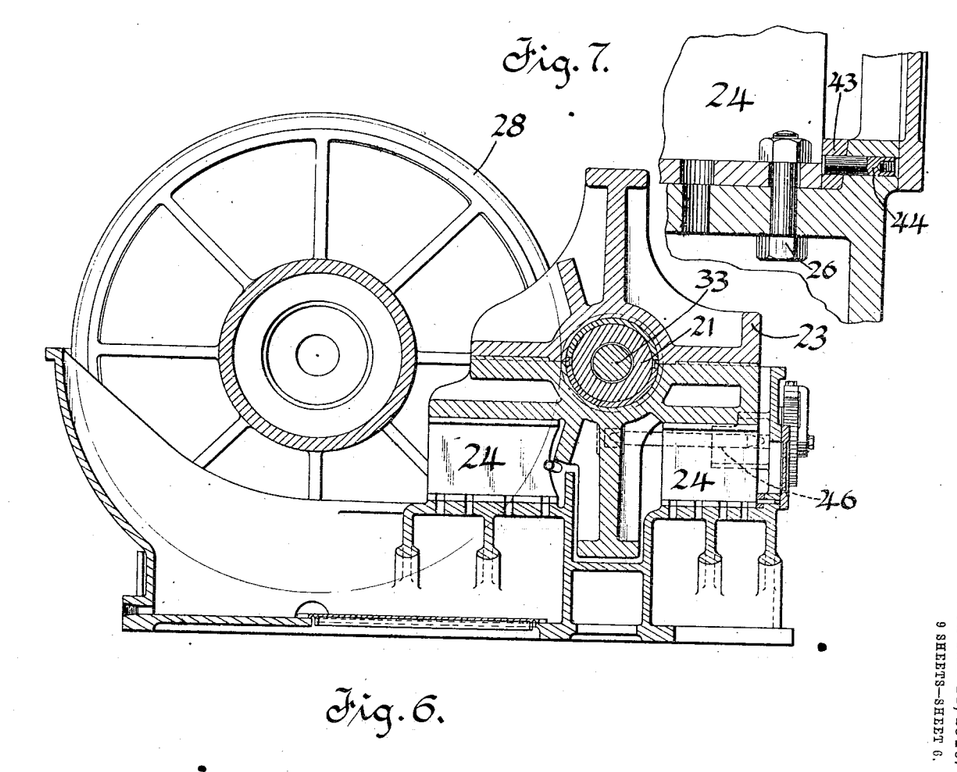
Fig. 6 is a section along the line E—F of Fig. 1.
Fig. 7 is an enlarged view of a portion of Fig. 6.
Figure 8:
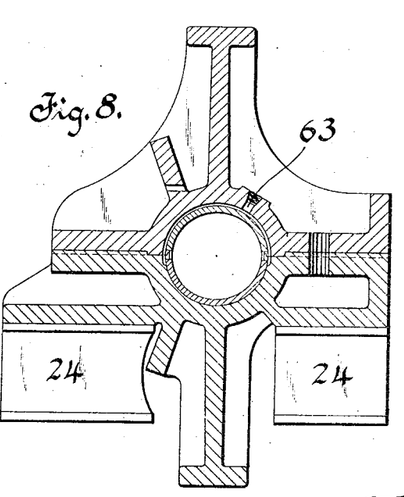
Fig. 8 is a section along the line A—B of Fig. 3.
Figure 9:
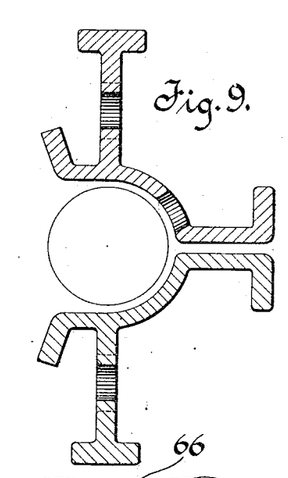
Fig. 9 is a section along the line K—L of Fig. 3.
Figure 10:
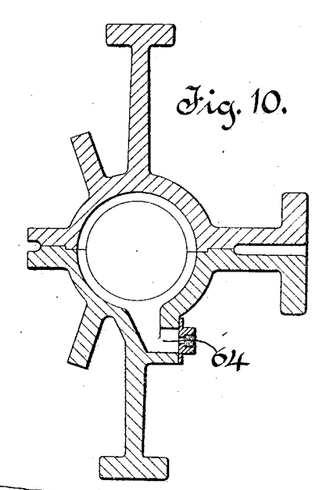
Fig. 10 is a section along the line E—F of Fig. 3.
Figure 11:
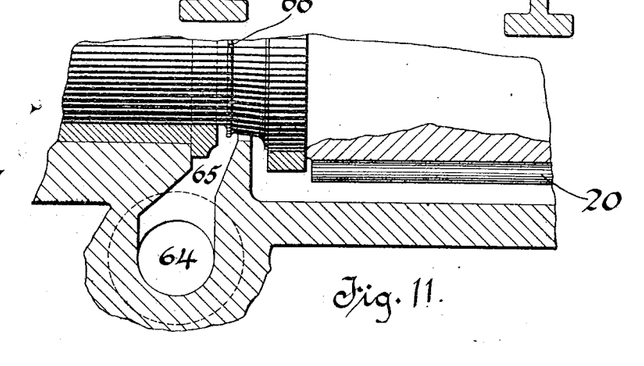
Fig. 11 is an enlarged view of a portion of the apparatus shown in section in Fig. 3.
Figures 12, 13:
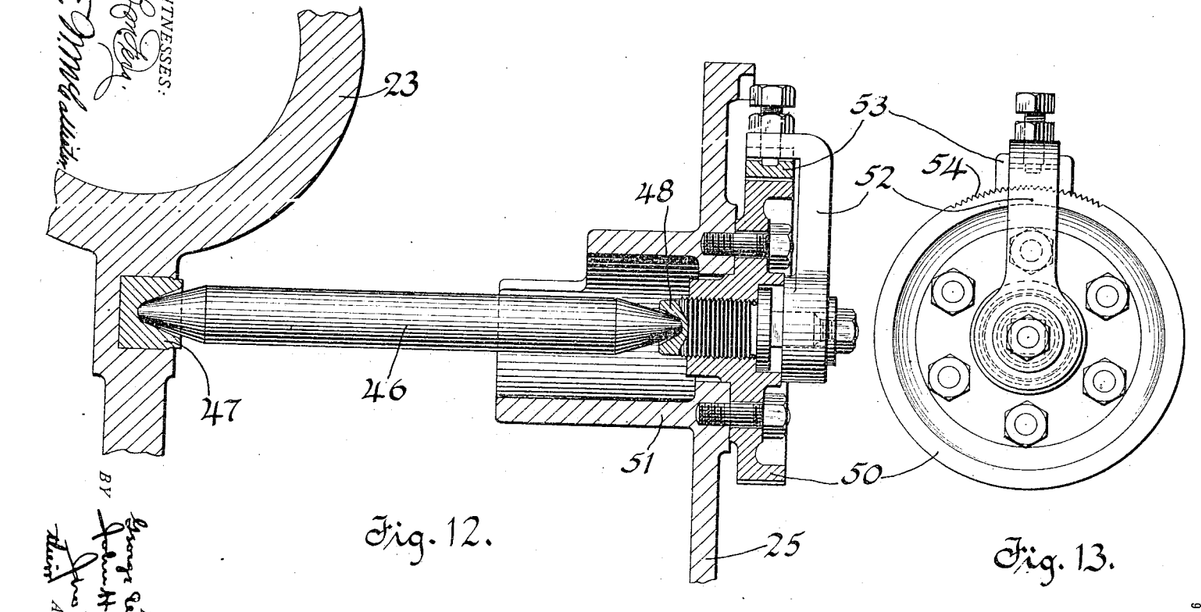
Fig. 12 is a view partially in section and partially in elevation illustrating the arrangement of a strut and its adjusting device, which forms a detail of our invention.
Fig. 13 is an end view of Fig. 12.
Figure 14:
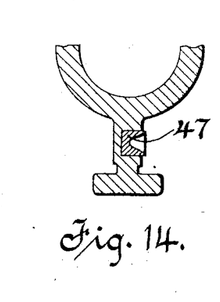
Fig. 14 is a partial section corresponding to a portion of Fig. 12.

The following is a description of the action of the forces when the gears are in operation. Referring to Fig. 18, let it be assumed that when parallelism of the axes is slightly disturbed, there is a tendency to return to exact parallelism; that is, the adjustment is stable. The pinions have longitudinal freedom in their bearings so that their longitudinal position is determined by the contact of the teeth of the gears and pinions. Therefore, neglecting friction, the opposing forces, B D and B′ D′ are equal. The 30° angle of the teeth will cause any frictional resistance in the bearings, resisting longitudinal movement, to be readily overcome. As at each tooth contact the forces will be sensibly normal to the tangent plane, the resultants B E and B′ E′ of these forces will be oppositely inclined to the vertical; the angles E B F and E′ B′ F′ being equal. B E and B′ E′ will be practically normal to the direction of the teeth; that is, in this case, the angle E B F equals E′ B′ F′ and equals 30°. Therefore, the vertical components B F and B′ F′ must be equal. As the frame carrying the pinions can yield by rotation about its horizontal transverse axis, it will adjust itself so that the moment B F × B C equals the moment B′ F′ × B′ C′; and as B F and B′ F′ are equal, the arms B C and B′ C′ must also be equal.

Similar statements hold with regard to the horizontal transverse components through B and B'. It is, of course, understood that the forces above referred to represent the resultants of forces at the tooth contacts, the actual force being distributed all along the contacts. Thus the distribution of pressure on the teeth of the two pinions will adjust itself automatically so as to be symmetrical as the bearings wear. If the gears are well cut and finished under load, the distribution of stresses will be nearly uniform. When this is once attained, and if no cutting occurs, the distribution will remain good under all conditions, providing the floating frame is made stiff enough.

The bearings of both the pinions and large gears are made unadjustable, the bushes being turned inside and outside to concentric cylinders. Thus, if their seats are turned out true the bearings will be in perfect alinement each time new bushes are fitted.

For a perfectly uniform distribution of stresses at the tooth contacts, the points B and B' must fall at the center of the pinions. If the contacts are slightly harder at, say, the outer end than at the inner ends of the pinions, B and B' would be slightly displaced from the center. With a very stiff frame this displacement need only to be very slight at any time.

In a design where straight teeth are utilized, there would be no longitudinal force at the tooth contacts; hence, it would be necessary to determine the longitudinal position of the pinions by some means; for instance, a collar secured to the ends of the journals or by bolting the shaft 33 firmly to the motor shaft 36. The equality of vertical forces on the two pinions and of the horizontal transverse forces, and also of the transverse moment explained in connection with Fig. 18, holds good with straight as well as spiral teeth.

With the struts 46 in place, the floating frame 23 is deprived of angular movement in a horizontal plane and the position of the axis of the pinions is definite and is controlled by the forces at the tooth contacts; that is, by the position of the axis of the gears. If the struts are removed the stability of the adjustment of the axes of the gears and pinions will depend upon the form of the teeth. With teeth having concave flanks, such as epicycloidal teeth, the parallelism of the axes will be stable; that is, if it is slightly disturbed the action of the teeth will compel the axes to return to parallelism. With teeth having convex flanks, such as involute teeth, the parallelism of the axes is unstable and on being slightly disturbed, the angularity will go on increasing. With such teeth it is necessary to use struts 46. Even with a stable arrangement, it would be a safe precaution to use the struts to prevent an excessive disturbance due to accident. With the struts in place what has been said of the longitudinal and vertical forces with reference to Fig. 18 and of the moments of the vertical forces, still holds true and the advantages derived from the floating frame are little, if any, impaired.

The gearing may be provided with any suitable covering, preferably a casing built of thin sheet metal and angle irons and provided with openings covered by wire gauze supported on wire netting. These openings will be so arranged that the action of the gears will suck in the air and expel it from the casing after it has been utilized in cooling or partially cooling the gears. This casing may also be provided to prevent the escape of oil. If necessary the casing may be lagged with felt blanket or with wood, or with any other suitable material to prevent resonance.

It will be understood that various changes may be made in the construction of this apparatus and it will be apparent to those skilled in the art that if desirable the gears 28 may be provided with a floating frame instead of the pinions.

In accordance with the provisions of the patent statutes, we have described the principle of operation of our invention, together with the apparatus which we now consider to represent the best embodiment thereof, but we desire to have it understood that the apparatus shown is only illustrative and that the invention can be carried out by other means.

What we claim is:

1. In reduction gearing, a gear, a pinion meshing therewith and supporting means constructed so as to allow relative angular motion between said gear and said pinion in a plane perpendicular to the plane of the axis of the gear and the axis of the pinion.

2. In reduction gearing, a gear, a pinion meshing therewith and supporting means constructed so as to allow angular motion between said gear and said pinion about an axis perpendicular to the original plane of the axes of the gears.

3. In reduction gearing, a gear, a pinion meshing therewith and supporting means constructed so as to allow relative angular motion between said gear and said pinion in a plane normal to the original plane of the axes of the gear and pinion and at right angles to a line normal to the original position of the axes of the gear and pinion.

4. In reduction gearing, a gear, a pinion meshing therewith and supporting means for the pinion constructed so as to allow relative angular motion between said gear and said pinion in a plane perpendicular to the plane of the axis of the gear and the axis of the pinion.

5. In reduction gearing, a gear, a pinion meshing therewith, a frame carrying the pinion, supporting means for the frame constructed so as to allow relative angular motion between said gear and said pinion in a plane perpendicular to the plane of the axis of the gear and the axis of the pinion.

6. In reduction gearing, a gear, a pinion meshing therewith, means supporting said pinion constructed so as to allow relative angular motion between said gear and said pinion in a plane perpendicular to the plane of the axis of the gear and the axis of the pinion and means preventing motion of said pinion in the plane of the axis of the gear and the axis of the pinion.

7. In reduction gearing, a gear, a pinion meshing therewith, supporting means for the pinion constructed so as to allow limited relative angular motion between said gear and said pinion in a plane perpendicular to the plane of the axis of the gear and the axis of the pinion, and a driving shaft connected to said pinion adjacent its end farthest removed from the point of application of the driving force.

8. In reduction gearing, a pair of driving gears, a common mounting member therefor, a pair of driven gears in mesh with said driving gears, a common mounting member for said driven gears and means permitting relative motion between said mounting members whereby the distribution of pressure on the teeth of the driving gears is automatically adjusted.

9. In reduction gearing, a pair of driving gears, a common mounting member therefor, a pair of driven gears in mesh with said driving gears, a common mounting member for said driven gears, means for permitting relative motion between said mounting members whereby the distribution of pressure on the teeth of the driving gears is automatically adjusted and means for limiting the relative motion to a movement in one plane.

10. In reduction gearing, a pair of driving gears, a common mounting member therefor, a pair of driven gears in mesh with said driving gears, a common mounting member for said driven gears, means for permitting relative motion between said mounting members whereby the distribution of pressure on the teeth of the driving gears is automatically adjusted and means for limiting the relative motion to a movement in a plane perpendicular to the plane of the axes of the gears.

11. In reduction gearing, a pair of driving gears, a common mounting member therefor, a pair of driven gears in mesh with said driving gears, a common mounting member for said driven gears, means for permitting relative motion between said mounting members whereby the distribution of pressure on the teeth of the driving gears is automatically adjusted and regulable means for limiting the relative motion to a movement in a plane perpendicular to the plane of the axes of the gears.

12. In reduction gearing, a pair of driving gears, a common mounting member therefor, a pair of driven gears in mesh with said driving gears, a common mounting member for said driven gears, means for permitting relative motion between said mounting members whereby the distribution of pressure on the teeth of the driving gears is automatically adjusted and screw adjusted means for limiting the relative motion to a movement in a plane perpendicular to the plane of the axes of the gears.

13. In reduction gearing, a driving agent, a driving member, a flexible connection between said agent and said member, driving gears mounted on said member, driven gears in mesh with said driving gears, a mounting member for said driving gears, means for permitting relative angular motion between said mounting member and said driving member whereby the distribution of pressure on the teeth of the driving gears is automatically adjusted.

14. In reduction gearing, a gear, a pinion meshing therewith and supporting means constructed so as to allow relative angular motion between said gear and said pinion due to tooth pressures during operation in a plane perpendicular to the plane of the axes of the gear and pinion to permit of automatic distribution of the tooth pressures.

15. In reduction gearing, a driving agent, a pair of driven gears, a hollow mounting member for said gears, a shaft located within said hollow member and secured thereto at one end only, a flexible connection between the other end of said shaft and said driving agent, a pair of driven gears meshing with said driving gears, rigidly mounted journals for said driven gears and a yielding support in which said hollow member is journaled.

16. In reduction gearing, a driving agent, a hollow member, a pair of driving gears mounted on said member, a shaft located within said hollow member and secured thereto at one end only, a flexible connection between the other end of said shaft and said driving agent, a pair of driven gears meshing with said driving gears, a yielding support for said hollow member, a rigid support for said driven gears and means for delivering cooling liquid to said hollow member between said member and said shaft.

17. In reduction gearing, a driving agent, a pair of driving gears, a hollow mounting member for said gears, a shaft located within said member and secured thereto at one end only, a flexible member connected to the other end of said shaft and to said driving agent, a pair of driven gears meshing with said driving gears, a yielding support for said hollow member and means for delivering cooling liquid to the interior of said hollow member between it and said shaft.

18. In reduction gearing, a driving agent, a pair of driving gears, a hollow mounting member for said gears, a shaft located within said hollow member and secured thereto at one end only, a flexible connection between the other end of said shaft and said driving agent, a pair of driven gears meshing with said driving gears, a yielding support for said hollow member, means for introducing a cooling fluid to one end of said hollow member and means for discharging it from the other end.

19. In reduction gearing, a foundation member, a pair of gears rotatably mounted in bearings provided therefor and secured to said foundation member, a floating frame, a pair of gears rotatably mounted in bearings provided in said frame and meshing with said first mentioned gears, a yielding support for said frame mounted on said foundation member and secured to said frame midway between said gears, and struts located between said frame and said foundation member for limiting the motion of said frame.

20. In reduction gearing, a foundation member, a pair of driven gears, a mounting member therefor journaled in bearings secured to said foundation member, a frame, a pair of driving gears rotatably mounted in bearings provided in said frame and meshing with said driven gears and a yielding support for said frame secured thereto midway between said gears.

21. In reduction gearing, a foundation plate, a pair of driven gears, a mounting member therefor journaled in bearings secured to said foundation plate, a frame, a pair of driving gears rotatably mounted in bearings provided in said frame and meshing with said driven gears and a support for said frame comprising two alined I-beams secured thereto midway between said gears.

22. In reduction gearing, a gear, a pinion meshing therewith, a frame carrying said pinion and an eye-beam support for said frame arranged so as to allow relative angular motion between said gear and said pinion due to tooth pressures in a plane perpendicular to the plane of the axes of the gear and pinion.

23. In reduction gearing, a foundation member, a pair of driven gears, a mounting member therefor journaled in bearings secured to said foundation member, a frame, a pair of driving gears rotatably mounted in bearings provided in said frame and meshing with said driven gears, and an I-beam support for said frame whereby said frame is capable of motion in two planes.

24. In reduction gearing, a foundation plate, a pair of driven gears, a mounting member therefor journaled in bearings secured to said foundation plate, a frame, a pair of driving gears rotatably mounted in bearings provided in said frame and meshing with said driven gears, and an I-beam support secured to said frame and extending transversely of the axis of said gears.

25. In reduction gearing, a foundation plate, a pair of driven gears, a mounting member therefor journaled in bearings secured to said foundation plate, a frame, a pair of driving gears rotatably mounted in bearings provided in said frame and meshing with said driven gears, a yielding support for said frame and means for limiting said frame to movement in one plane.

26. In reduction gearing, a foundation plate, a pair of driven gears, a mounting member therefor journaled in bearings secured to said foundation plate, a frame, a pair of driving gears rotatably mounted in bearings provided in said frame and meshing with said driven gears, a yielding support for said frame and adjustable struts operating between said foundation plate and said frame to limit said frame to motion in one plane.

27. In reduction gearing, a foundation plate, a pair of driven gears, a mounting member therefor journaled in bearings secured to said foundation plate, a frame, a pair of driving gears rotatably mounted in bearings provided in said frame and meshing with said driven gears and an I-beam support for said frame secured thereto midway between said gears whereby said frame is capable of angular motion in the plane of the axes of the two pairs of gears and in a plane perpendicular thereto.

28. In reduction gearing, a foundation plate, a pair of driven gears, a mounting member therefor journaled in bearings secured to said foundation plate, a frame, a pair of driving gears rotatably mounted in bearings provided in said frame and meshing with said driven gears and two alined I-beams extending transversely of the axis of said gears and secured to said frame midway between said gears.

29. In reduction gearing, in combination with a power transmitting agent, a pair of gears, a mounting member therefor journaled in bearings, a second pair of gears meshing with said first mentioned gears, a frame, a hollow mounting member therefor journaled in said frame, a shaft located within said hollow member and secured thereto at one end only, and a flexible connection between the other end of said shaft and said agent.

30. In reduction gearing, in combination with a power transmitting agent, a pair of gears, a mounting member therefor journaled in bearings, a second pair of gears meshing with said first mentioned gears, a frame, a hollow mounting member therefor journaled in said frame, a shaft located within said hollow member and secured thereto at one end only, a flexible connection between the other end of said shaft and said driving agent and a yielding support for said frame comprising two axially alined I-beams secured to said frame midway between said gears.

31. In reduction gearing, in combination with a power transmitting agent, a pair of gears, a second pair of gears meshing with said first mentioned gears, a frame, a hollow mounting member therefor journaled in said frame, a shaft located within said hollow member and secured thereto at one end only, a flexible connection between the other end of said shaft and said driving agent and an I-beam support secured to said frame and extending transversely of the axis of said gears.

32. In reduction gearing, in combination with a power transmitting agent, a pair of gears, a second pair of gears meshing with said first mentioned gears, a frame, a hollow mounting member therefor journaled in said frame, a shaft located within said hollow member and secured thereto at one end only, a flexible connection between the other end of said shaft and said agent and means for yieldingly supporting said frame.

33. In reduction gearing, in combination with a power transmitting agent, a pair of gears, a second pair of gears meshing with said first mentioned gears, a frame, a hollow mounting member therefor journaled in said frame, a shaft located within said hollow member and secured thereto at one end only, a flexible connection between the other end of said shaft and said driving agent, means for supporting said frame and means for moving said frame laterally.

34. In reduction gearing, a driving agent, a pair of driving gears, a hollow mounting member therefor journaled in bearings and movable longitudinally therethrough, a shaft located within said member and secured thereto at one end only and a coupling between the other end of said shaft and said driving agent, in combination with a pair of driven gears meshing with said driving gears.

35. In reduction gearing, a driving agent, a pair of driving gears, a hollow mounting member therefor, a shaft located within said member and secured thereto at one end only and a coupling between the other end of said shaft and said driving agent, in combination with a pair of driven gears meshing with said driving gears.

36. In reduction gearing, in combination with a power transmission agent, a pair of gears, a hollow mounting member journaled in bearings and longitudinally movable therethrough, a shaft located within said member and secured thereto at one end only, a flexible connection between the other end of said shaft and said agent and a second pair of gears meshing with the first mentioned gears.

37. In a reduction gearing, in combination with a power transmission agent, a pair of gears, a hollow mounting member therefor journaled in bearings, a shaft located within said member and secured thereto at one end only, a flexible connection between the other end of said shaft and said agent and a second pair of gears meshing with the first mentioned gears.

38. In reduction gearing, in combination with a power transmission agent, a pair of gears, a hollow mounting member therefor journaled in bearings and longitudinally movable therethrough, a shaft located within said mounting member and secured thereto at one end only, a flexible connection between the other end of said shaft and said agent, a second pair of gears meshing with the first mentioned gears and means for shifting said first mentioned gears laterally with reference to said second pair of gears.

39. In reduction gearing, in combination with a power transmission agent, a pair of gears, a hollow mounting member therefor journaled in bearings, a shaft located within said member and secured thereto at one end only, a flexible connection between the other end of said shaft and said agent, a second pair of gears meshing with said first mentioned gears and means for shifting the first mentioned gears laterally with reference to said second pair of gears.

40. In reduction gearing, a pair of rigidly mounted rotatable gears, a second pair of gears meshing therewith and a supporting structure for said second pair of gears including an I-beam support extending transversely of the axes of said gears.

41. In reduction gearing, a pair of rigidly mounted rotatable gears, a second pair of gears meshing therewith, a frame for said second pair of gears and an I-beam support for said frame extending transversely of the axis of said gears and secured to said frame between said gears.

42. In reduction gearing, a pair of rigidly mounted rotatable gears, a second pair of gears meshing therewith, a frame carrying said second pair of gears and a yielding support for said frame.

43. In reduction gearing, a pair of rigidly mounted rotatable gears, a second pair of gears meshing therewith, a frame supporting said second pair of gears and a yielding support for said frame including two alined I-beams located midway between said gears.

44. In reduction gearing, a pair of rotatably mounted gears, a second pair of gears meshing therewith, a frame and a yielding support for said frame including two alined I-beams located midway between said gears and extending transversely of their axes.

45. In reduction gearing, in combination with a power transmission agent, a floating frame, a hollow member rotatably mounted in bearings provided in said frame, a pair of gears mounted on said member, a shaft located within said hollow member and secured thereto at one end only, a flexible connection between said shaft and said agent, an I-beam support for said frame secured thereto midway between said gears, means for moving said frame laterally and a second pair of rotatable gears meshing with the first mentioned gears.

46. In reduction gearing, in combination with a power transmission agent, a floating frame, a hollow mounting member rotatably mounted in bearings provided in said frame, a pair of gears mounted on said member, a shaft located within said member and secured thereto at one end only, a flexible coupling between said shaft and said agent, an I-beam support for said frame whereby said frame is capable of angular motion in two planes, means for adjusting said support whereby said frame is moved laterally, struts for limiting the motion of said frame to one plane and a pair of gears rotatably mounted in stationary bearings and meshing with the gears of said frame.

47. In reduction gearing, a hollow gear-carrying member, a shaft of less diameter than the internal bore of said member located within said member and secured thereto at one end only and means provided at one end of said member for introducing a cooling liquid between said shaft and said member and means secured to the end of said shaft for collecing and discharging the cooling liquid.

48. In reduction gearing, a hollow toothed member, a shaft of less diameter than the internal bore thereof located therein and keyed thereto at one end only, means provided at the keyed end of said shaft for introducing a cooling liquid between said shaft and said member and means secured to the free end of said shaft for collecing and discharging cooling liquid.

49. In reduction gearing, a hollow toothed member, a shaft of less diameter than the internal bore thereof located therein and keyed thereto at one end only, and means provided at the keyed end of said shaft for introducing a cooling liquid between said shaft and said member.

50. In reduction gearing, a gear and a pinion meshing therewith, a frame carrying said pinion and a support extending on the opposite sides of the axis of said pinion and constructed so as to allow relative angular motion between the axis of said gear and that of the pinion due to tooth pressure in a plane parallel to the axes of said gear and pinion and perpendicular to the plane containing said axes.

51. In reduction gearing a gear, a pinion meshing therewith, a frame carrying said pinion, supporting means for said frame constructed so as to allow relative angular motion between said gear and said pinion due to tooth pressures, means for limiting such relative angular motion to a plane perpendicular to the plane including the axes of the gear and pinion, a driving shaft and a flexible coupling between said shaft and said pinion constructed so that it can only exert a rotative torque on said pinion.

52. In reduction gearing, a gear, a pinion meshing therewith, a frame carrying said pinion and means for mounting said frame extending on opposite sides of the plane including the axis of said pinion and perpendicular to the plane including the axes of the gear and pinion so that said frame is capable of being swung by the tooth pressures during the operation of the gearing to permit of the automatic distribution of such pressures.

53. In reduction gearing, a gear, a pinion meshing therewith, a frame carrying said pinion and means for yieldingly mounting said frame so that it is capable of being swung during the operation of the gearing to permit of the automatic distribution of the tooth pressures.

54. In reduction gearing, a gear, a pinion meshing therewith, a frame carrying said pinion and mounting means for said frame located below said pinion and constructed so that said frame is capable of being deflected by the tooth pressures encountered during the operation of the gearing to permit of the automatic distribution of such pressures.

55. In reduction gearing, a gear, a pinion meshing therewith, a frame carrying said pinion and a flexible support for said frame located below said pinion and midway between the ends thereof and constructed so that said frame is capable of being swung by the tooth pressures encountered during the operation of the gearing to permit of the automatic distribution of such pressures.

56. In reduction gearing, a gear and a pinion each having two sets of oppositely disposed spiral teeth, a frame for said pinion provided with three axially alined bearings for said pinion, eye-beam supporting means for said frame arranged so that said frame is capable of being swung by the tooth pressures encountered during the operation of the gearing to permit of the automatic distribution of such pressures, adjustable means for limiting the movement of said frame to the plane including the axis of said pinion and perpendicular to the plane including the axes of the gear and pinion, a power shaft and a flexible coupling between said shaft and said pinion.

In testimony whereof, I have hereunto subscribed my name this 18th day of February, 1907.

GEO. W. MELVILLE.

Witnesses:
CHARLES W. McGHEE,
JNO. S. GREEN.

In testimony whereof, I have hereunto subscribed my name this 19th day of February, 1907.

JOHN H. MACALPINE.

Witnesses:
GEO. W. HUNT,
THOS. J. HUNT.